(12) United States Patent
Wong et al.

(10) Patent No.: US 12,458,219 B2
(45) Date of Patent: Nov. 4, 2025

(54) LARYNGOSCOPY APPARATUS HAVING MEANS FOR CLEARING MATERIAL FROM ITS VIEWING WINDOW

(71) Applicant: The Regents of the University of California, Oakland, CA (US)

(72) Inventors: Waylan Wong, Orange, CA (US); Gabriel Punsalan, Orange, CA (US)

(73) Assignee: The Regents of the University of California, Oakland, CA (US)

( * ) Notice: Subject to any disclaimer, the term of this patent is extended or adjusted under 35 U.S.C. 154(b) by 649 days.

(21) Appl. No.: 17/586,573

(22) Filed: Jan. 27, 2022

(65) Prior Publication Data

US 2022/0233066 A1  Jul. 28, 2022

Related U.S. Application Data

(60) Provisional application No. 63/142,444, filed on Jan. 27, 2021.

(51) Int. Cl.
| | | |
|---|---|---|
| *A61B 1/267* | (2006.01) | |
| *A61B 1/00* | (2006.01) | |
| *A61B 1/05* | (2006.01) | |
| *A61B 1/12* | (2006.01) | |

(52) U.S. Cl.
CPC .......... *A61B 1/267* (2013.01); *A61B 1/00066* (2013.01); *A61B 1/00091* (2013.01); *A61B 1/00096* (2013.01); *A61B 1/00135* (2013.01); *A61B 1/00165* (2013.01); *A61B 1/05* (2013.01); *A61B 1/126* (2013.01)

(58) Field of Classification Search
CPC ............ A61B 1/00091; A61B 1/00096; A61B 1/0009; A61B 1/015; A61B 1/126; A61B 1/267
See application file for complete search history.

(56) References Cited

U.S. PATENT DOCUMENTS

| | | | |
|---|---|---|---|
| 4,126,127 A | | 11/1978 | May |
| 5,702,351 A | * | 12/1997 | Bar-Or ................ A61B 1/267 600/187 |
| 6,248,061 B1 | | 6/2001 | Cook, Jr. |
| (Continued) | | | |

FOREIGN PATENT DOCUMENTS

| | | |
|---|---|---|
| CN | 110215182 A | 9/2019 |
| CN | 210204680 U | 3/2020 |
| (Continued) | | |

OTHER PUBLICATIONS

International Search Report and Written Opinion for International Application No. PCT/US2022/070390 mailed May 17, 2022.

(Continued)

*Primary Examiner* — Eduardo C Robert
*Assistant Examiner* — Holly Joanna Lane
(74) *Attorney, Agent, or Firm* — Risley IP; David R. Risley

(57) ABSTRACT

In one embodiment, a laryngoscopy apparatus includes a handle configured for gripping by an operator, a blade extending from the handle configured for insertion into the trachea of a patient, a clear viewing window provided on the blade that enables a patient's airway to be viewed, and means for clearing material from the viewing window that could obscure the view of the airway.

11 Claims, 4 Drawing Sheets

(56) References Cited

U.S. PATENT DOCUMENTS

| | | | |
|---|---|---|---|
| 6,569,089 B1 | 5/2003 | Covington et al. | |
| 7,608,040 B1 | 10/2009 | Dunst | |
| 7,878,973 B2 * | 2/2011 | Yee | A61B 1/00032 |
| | | | 600/199 |
| 9,320,420 B2 * | 4/2016 | Goldstein | A61B 1/267 |
| 10,517,474 B2 * | 12/2019 | Shu | A61B 1/015 |
| 11,103,130 B2 | 8/2021 | Napier | |
| 2006/0276693 A1 * | 12/2006 | Pacey | A61B 1/267 |
| | | | 600/188 |
| 2007/0161863 A1 * | 7/2007 | Bentt | A61M 16/0463 |
| | | | 600/187 |
| 2016/0213241 A1 | 7/2016 | Goldstein | |
| 2016/0256047 A1 * | 9/2016 | Newcomb | A61B 1/0684 |
| 2016/0345803 A1 * | 12/2016 | Mallory | A61B 1/267 |
| 2020/0288960 A1 * | 9/2020 | Napier | A61B 1/0684 |

FOREIGN PATENT DOCUMENTS

| | | |
|---|---|---|
| GB | 2477084 A | 7/2011 |
| KR | 20120102197 | 9/2012 |
| KR | 20120102198 A | 9/2012 |

OTHER PUBLICATIONS

European Search Report in related EP Application No. 22746911, dated Oct. 29, 2024.

\* cited by examiner

LARYNGOSCOPY APPARATUS HAVING MEANS FOR CLEARING MATERIAL FROM ITS VIEWING WINDOW

CROSS-REFERENCE TO RELATED APPLICATION

This application claims priority to U.S. Provisional Application Ser. No. 63/142,444, filed Jan. 27, 2021, which is hereby incorporated by reference herein in its entirety.

BACKGROUND

Video laryngoscopy is often used during emergency breathing tube placement to save lives. However, liquids, such as airway secretions, gastric fluid, blood, and/or solids, such as regurgitated food, can cover the viewing window of the laryngoscope camera and, therefore, obscure the view of the airway. This can lead to breathing tubes being misplaced within the esophagus instead of the trachea. Because the patient may not be breathing at the time, the attending medical professional is under extreme time pressure to place a laryngoscope and breathing tube within the patient's airway to restore respiration and prevent aspiration. If he or she cannot achieve this in a timely manner, the result can be hypoxemia, acidosis, and even death.

In view of these facts, it can be appreciated that it would be desirable to have a video laryngoscopy apparatus that includes means for clearing material that could obscure the view of a patient's airway during insertion of the apparatus into the trachea.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have a laryngoscopy apparatus that includes means for clearing material, such as patient liquids and/or solids, that could obscure the view of a patient's airway during insertion of the apparatus into the trachea. Examples of such an apparatus are disclosed herein. In one embodiment, a laryngoscopy apparatus is configured as a sleeve having a handle from which an elongated blade extends. The laryngoscopy apparatus is configured to receive a video device, such as a video baton, and the blade is configured to be inserted by a medical professional into the trachea of a patient for the purpose of intubation (i.e., placing a tracheal tube within the trachea). The apparatus comprises a first channel that extends through the handle and the blade, and terminates with a clear viewing window. When a camera of the video device is positioned against or adjacent to the viewing window, the internal anatomy of the patient can be viewed via images captured by the camera during insertion of the blade. The apparatus further includes a second channel that facilitates clearing of the viewing window of the laryngoscopy apparatus with a jet of fluid and a third channel that can be used to remove the ejected fluid and any material that has been cleared by the jet.

In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

Figure 1:
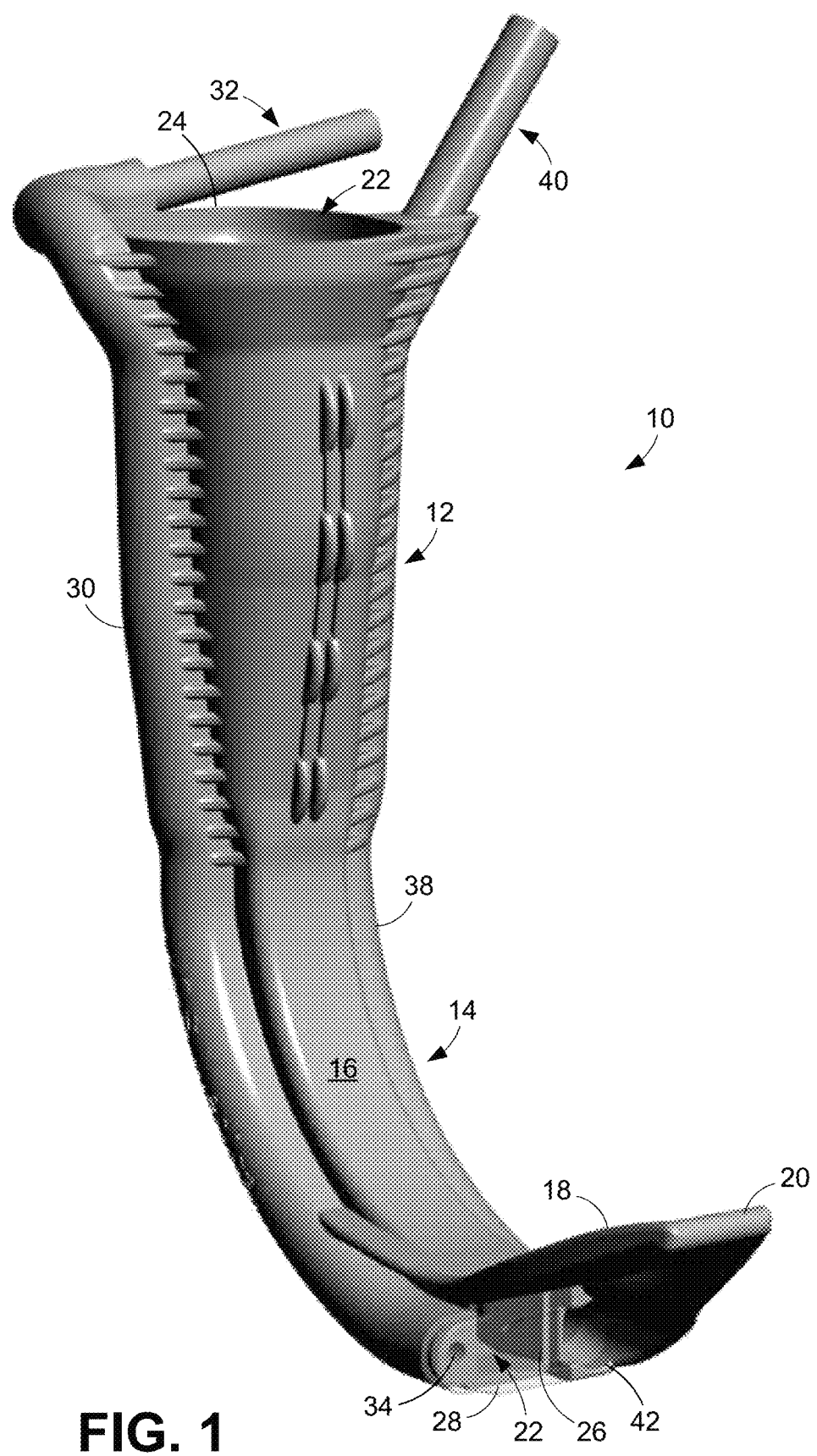
FIG. 1 is a front perspective view of an embodiment of a laryngoscopy apparatus.

FIG. 1 illustrates an example embodiment of a laryngoscopy apparatus 10 that includes means for clearing material from a viewing window of the apparatus. The example apparatus 10 of FIG. 1 is configured as a video laryngoscope sleeve that is configured to receive a video device, such as a video baton. The apparatus 10 generally includes a handle 12 that is configured to be gripped by an operator and an elongated curved blade 14 that is configured for insertion through the mouth and into the trachea for the purpose of intubating a patient. In some embodiments, the handle 12 and blade 14 are unitarily formed from an inexpensive material, such as a polymer material, so the laryngoscopy apparatus 10 can be inexpensively produced and, therefore, is suitable for one-time use and disposability. As is apparent from FIG. 1, the blade 14 includes a relatively thick proximal portion 16 that extends from the handle 12 and a relatively thin distal portion 18 that extends from the proximal portion. The distal portion 18 forms a distal tip 20 of the blade 14.

Figure 2:
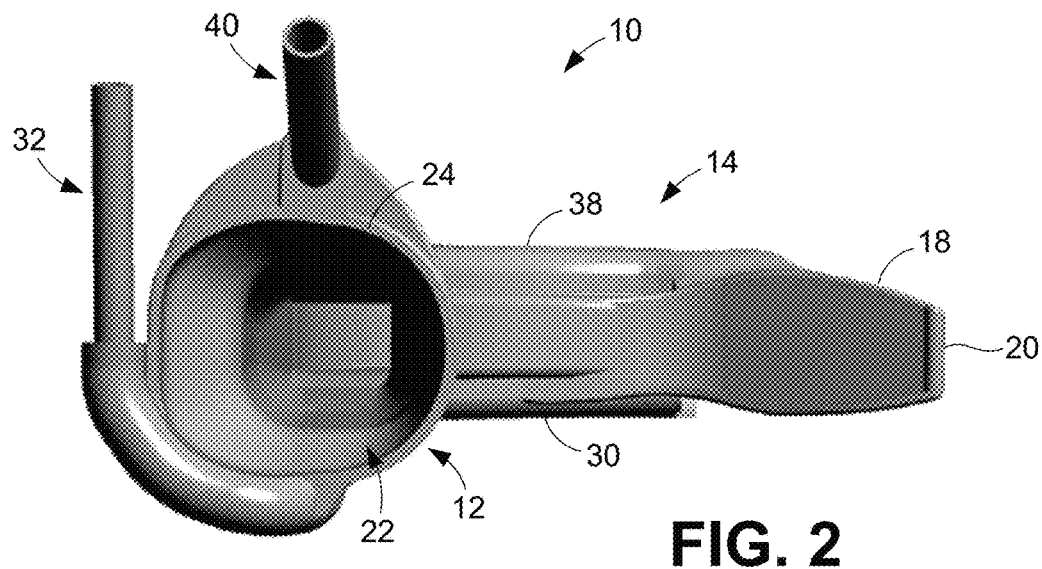
FIG. 2 is a top view of the laryngoscopy apparatus of FIG. 1.
Figure 3:
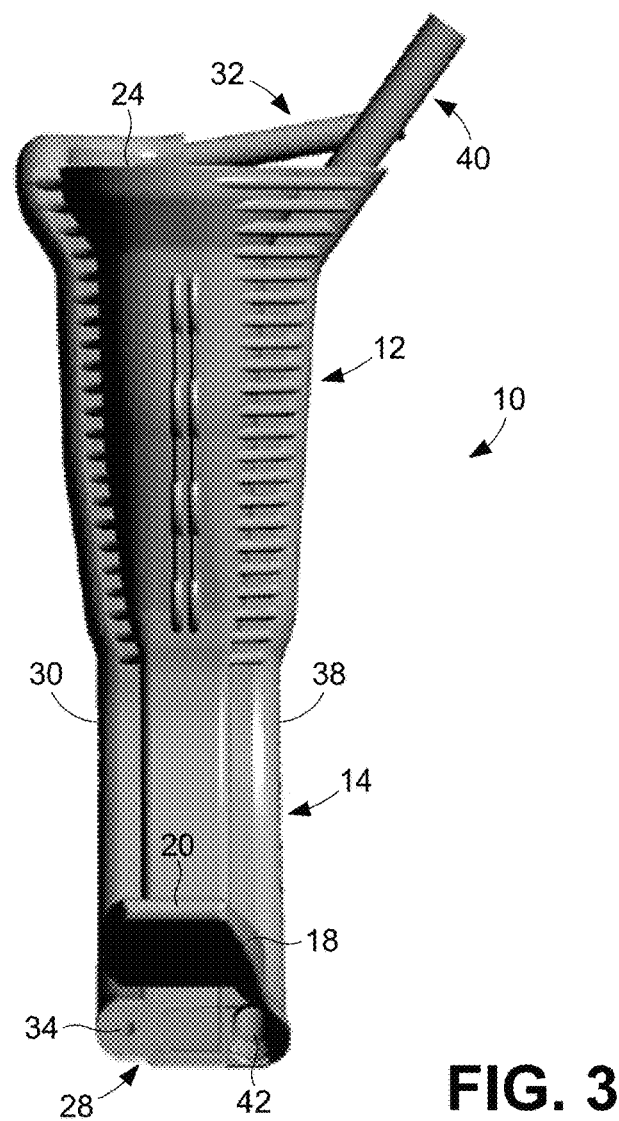
FIG. 3 is a front view of the laryngoscopy apparatus of FIG. 1.

Extending through the handle 12 and the proximal portion 16 of the blade 14 is a first or primary channel 22 that is configured to receive the video device. In some embodiments, the primary channel 22 is specifically configured to receive, through a proximal opening 24 of the channel formed by the handle 12, a particular model of video baton (not shown) that comprises a body, a camera, and a shaft that extends between the body and camera. By way of example, a body of the baton can be positioned within a proximal portion of the primary channel 22 formed by the handle 12, the shaft can extend through a distal portion of the channel, and the camera can be positioned adjacent to a first distal opening 26 of the channel formed by the blade 14. As shown most clearly in FIGS. 2 and 4, the primary channel 22 can, in some embodiments, have a generally rectangular (e.g., square) cross-section.

With reference to FIGS. 1 and 3-6, provided at the first distal opening 26 of the primary channel 22 is a clear viewing window 28 through which images and/or video (video being a series of sequential images) can be captured by the camera of the video device that is used with the laryngoscopy apparatus 10. The viewing window 28 at least covers and seals the first distal opening 26 of the primary channel 22 so that material, such as liquids and/or solids from within the patient, cannot enter the primary channel. As is described below, however, the viewing window 28 can, in some embodiments, extend beyond the first distal opening 26 to serve a further purpose, such as forming a nozzle from which fluid can be ejected to clear material from the window. By way of example, the viewing window 28 can also made of a polymer material.

It is noted that, although a video baton has been identified as an example video device that can be received by and used with the laryngoscopy apparatus 10, other video devices could be used with the apparatus. Indeed, substantially any video device having a camera that can be securely positioned within the distal portion of the primary channel 22 against or adjacent to the viewing window 28 could be used. Furthermore, it is noted that the video device need not include a camera that is positioned within the blade 14 or even the handle 12 of the laryngoscopy apparatus 10. For example, one or more optical waveguides, such as optical fibers, could be inserted through the primary channel 22 in a manner in which their distal ends are positioned in contact with or adjacent to the viewing window 28. In such a case, the one or more optical waveguides could transmit images to a camera that is either positioned within or outside of the laryngoscopy apparatus 10.

Referring again to FIG. 1, the laryngoscopy apparatus 10 also includes a second or fluid delivery channel 30. In the illustrated embodiment, the fluid delivery channel 30 forms part of and extends along a first lateral side of the handle 12 and the blade 14 (in particular, the proximal portion 16 of the blade). The fluid delivery channel 30 originates with a first proximal tube 32 that extends from the proximal end of the handle 12 and terminates with a second distal opening 34 that is positioned laterally adjacent to the first distal opening 26 of the primary channel 22. In the illustrated embodiment, the viewing window 28 that covers and seals the first distal opening 26 of the primary channel 22 also covers and seals the second distal opening 34 of the fluid delivery channel 30. As is most clearly apparent in FIG. 6, in such a case, the viewing window 28 includes an integrated fluid nozzle 36 unitarily formed with the viewing window that is in fluid communication with the second distal opening 34. The fluid nozzle 36 is configured to eject a high-velocity jet of fluid transversely across an outer surface 37 (see FIG. 6) of the portion of the viewing window that overlies the first distal opening 26 of the primary channel 22. The dashed line in FIG. 6 identifies the path of the fluid through the fluid delivery channel 30 and across the surface 37 of the viewing window 36. The ejected fluid can comprise a gas, a liquid, or a combination of the two. Example gases include air and oxygen. Example liquids include water, saline, as well as solutions that contain one or more beneficial ingredients, such as one or more medications. When a jet of fluid is ejected across the viewing window 28, material, such as fluids and/or solids from within the patient, are driven off of that outer surface so they will not obscure the view of the camera (or optical waveguide(s)) positioned behind the viewing window.

Figure 4:
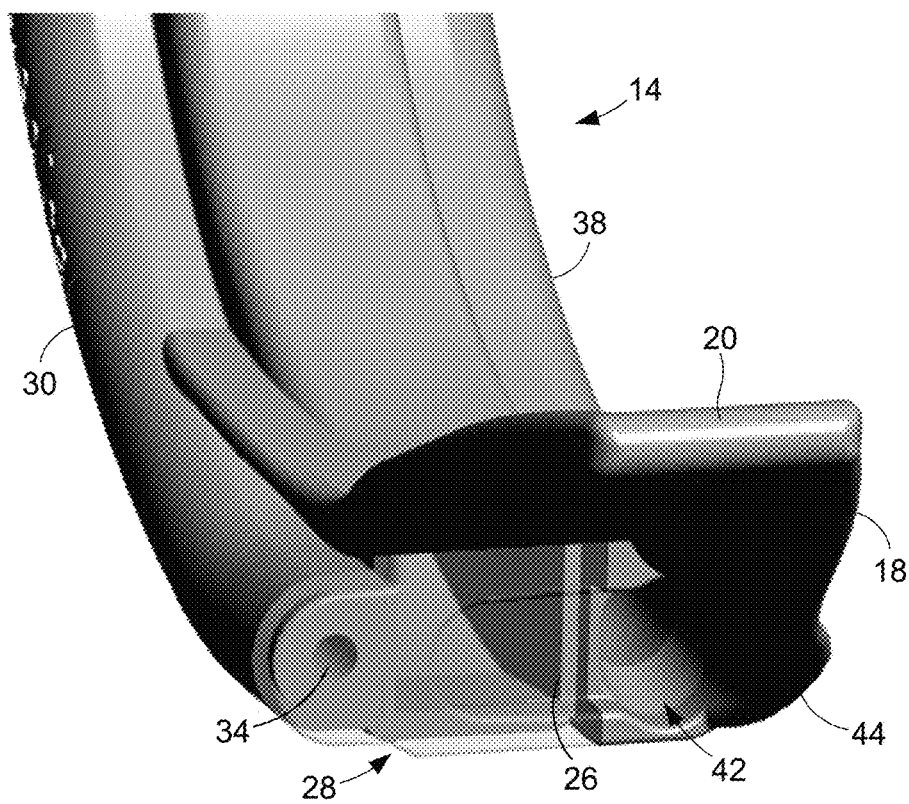
FIG. 4 is a first perspective detail view of a distal end of the laryngoscopy apparatus of FIG. 1.
Figure 5:
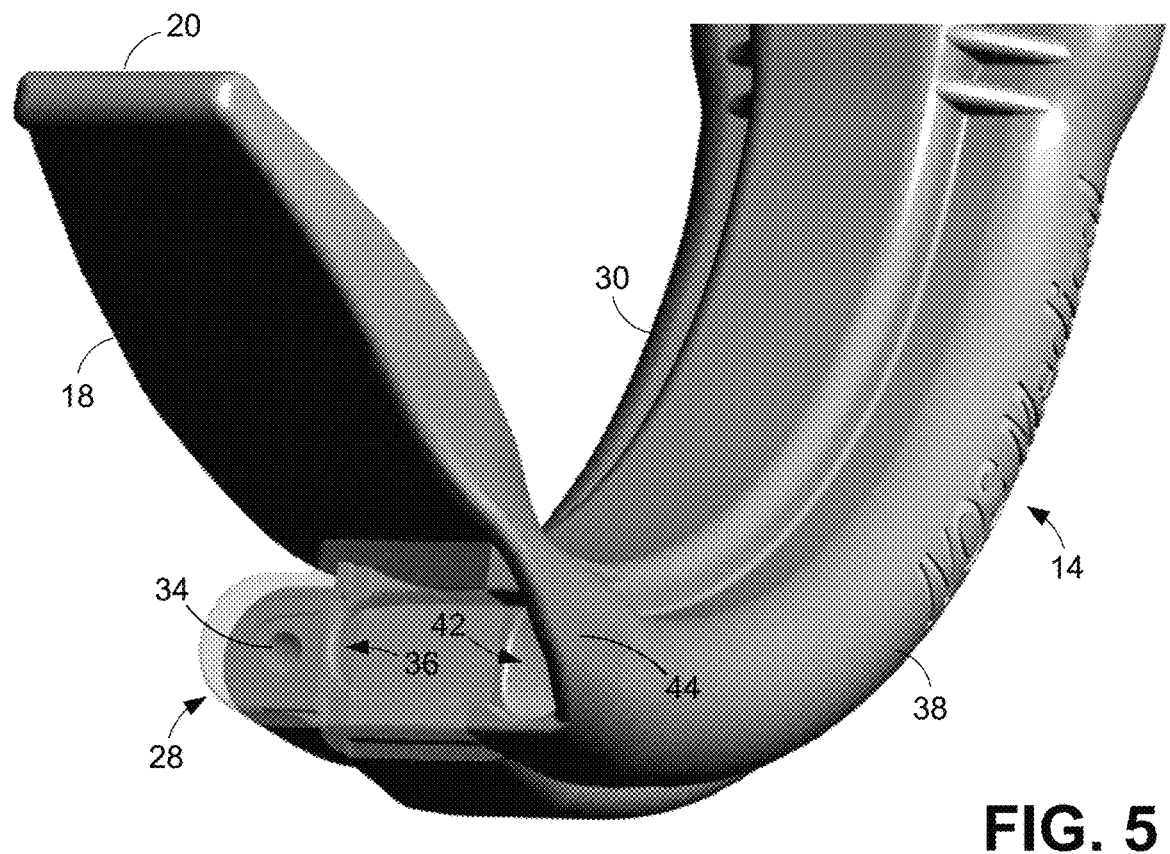
FIG. 5 is a second perspective detail view of the distal end of the laryngoscopy apparatus of FIG. 1.
Figure 6:
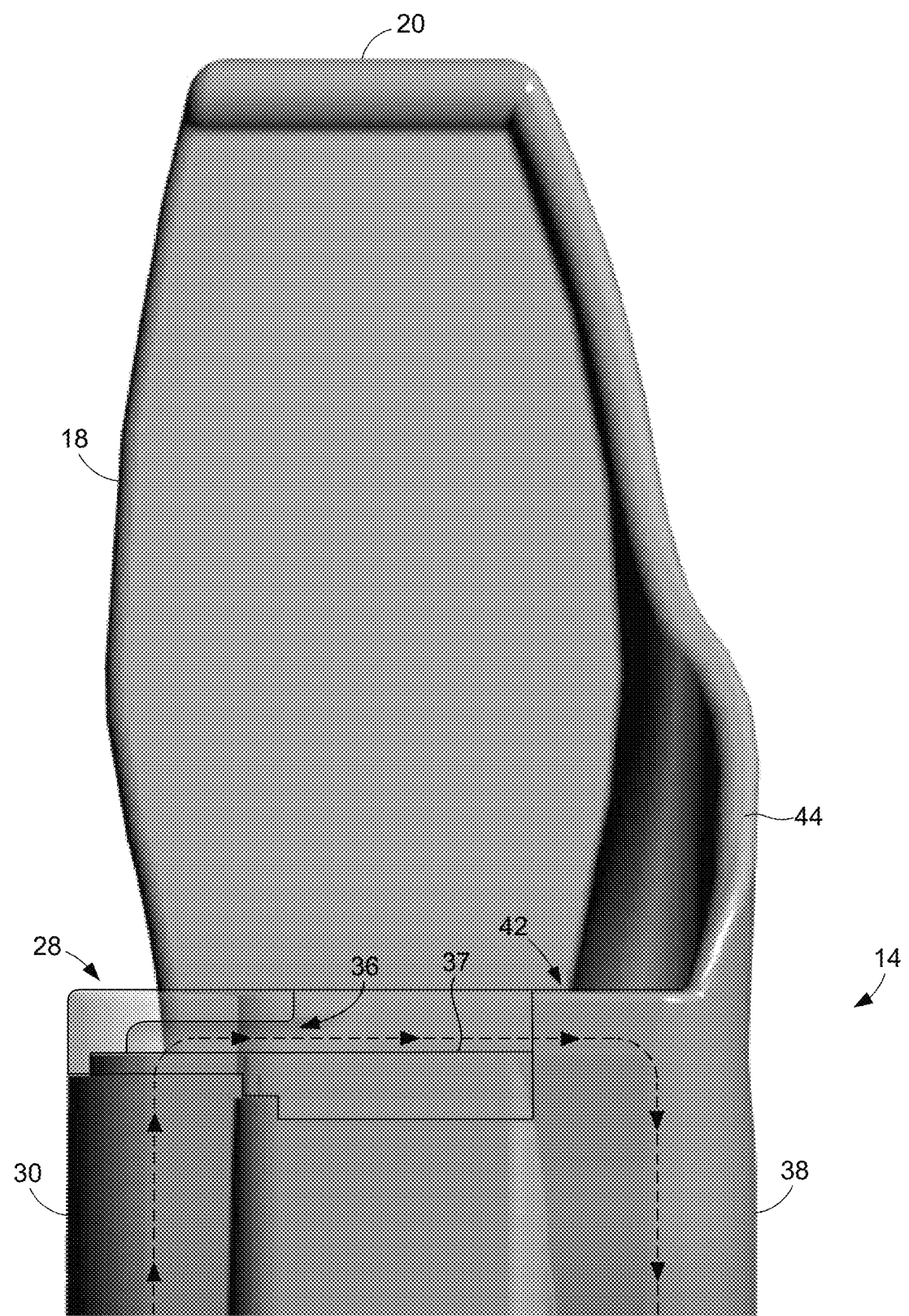
FIG. 6 is a top detail view of the distal end of the laryngoscopy apparatus of FIG. 1.

With reference to FIG. 4, provided on the opposite side of the fluid delivery channel 30 is a third channel 38, which, depending upon how it is used, can serve as a suction channel or a working channel. For the remainder of this disclosure, the third channel 38 will be referred to as an "auxiliary" channel. The auxiliary channel 38 of the illustrated embodiment forms part of and extends along a second lateral side of the handle 12 and the blade 14 (in particular, the proximal portion 16 of the blade). The auxiliary channel 38 originates with a second proximal tube 40 that extends from the proximal end of the handle 12 and terminates with a third distal opening 42 that is positioned laterally adjacent to the first distal opening 26 of the primary channel 22. As is apparent in FIG. 4, the third distal opening 42 is positioned on the opposite side of the primary channel 22 than the second distal opening 34 of the fluid delivery channel 30.

In a first use case, the auxiliary channel 38 is used as a suction channel. In such a case, a suction source (not shown) can be connected to the second proximal tube 40 so that material can be removed from the area adjacent the viewing window 28, as depicted by the dashed line in FIG. 6. This material can include any fluid ejected from the nozzle 36 as well as patient liquids and/or solids that the jet of fluid ejected from the nozzle has removed from the viewing window 28. Accordingly, the nozzle 36 and the auxiliary channel 38 can be used together to clear and remove material that could otherwise obstruct the view of the patient airway. As is most clearly apparent in FIGS. 4-6, the blade 14 can include a lateral flange 44 that extends between the distal end of the proximal portion 16 of the blade and the distal portion 18 of the blade next to the third distal opening 42. When provided, the flange 44 that serves as a backstop for the ejected fluid and removed material that moves across the viewing window 28 to assist in the removal of the fluid and material. It is further noted that, in some embodiments, the auxiliary channel 38 and/or its opening 42 can be optimized and positioned so as to configured to remove aerosolized virus from the patient.

In a second use case, the auxiliary channel 38 is used as a working channel through which other medical instruments can be passed. For example, a suction catheter (not shown) can be passed through the auxiliary channel 38 and used to clear the ejected fluid and/or patient material in similar manner to when the auxiliary channel is used as a suction channel. In addition, however, such a suction catheter can be extended beyond the distal end of the blade 14 to remove any material that exists beyond the third distal opening 42. As another example, a guidewire (not shown) can be passed through the auxiliary channel 38 to facilitate the insertion of another medical instrument into the patient. In such a case, the laryngoscopy apparatus 10 also functions as an introducer.

Although the example laryngoscopy apparatus disclosed above has been described as being configured as a sleeve adapted to receive a separate video device, such as a video baton, it is noted that, in other embodiments, the laryngoscopy apparatus can include it's own integrated camera device, in which case the apparatus is actually a video laryngoscope. The term "laryngoscopy apparatus" is used broadly herein to include both sleeves for use with separate video devices as well as video laryngoscopes having their own fully integrated cameras.

The invention claimed is:

1. A video laryngoscopy sleeve configured to receive a separate video device or an optical waveguide configured to transmit images to a video device, the video laryngoscopy sleeve comprising:
   a handle configured for gripping by an operator;
   a blade extending from the handle configured for insertion through the mouth of a patient;
   a first channel that extends through the handle and the blade and that terminates in a first distal opening positioned near a distal end of the blade, wherein the first channel is enclosed, wherein the first channel is sized such that the first channel is configured to contain the video device or the optical waveguide configured to transmit images to a video device;
   a clear viewing window provided on the blade that enables a patient's airway to be viewed; and
   means for clearing material from the viewing window that could obscure the view of the airway.

2. The video laryngoscopy sleeve of claim 1, wherein the blade is curved.

3. The video laryngoscopy sleeve of claim 1, wherein the blade has a relatively thick proximal portion that extends from the handle and a relatively thin distal portion that extends from the relatively thick proximal portion and forms the distal tip of the blade.

4. The video laryngoscopy sleeve of claim 1, wherein the viewing window covers and seals the first distal opening.

5. The video laryngoscopy sleeve of claim 1, wherein the sleeve is designed for a single use.

6. The video laryngoscopy sleeve of claim 1, wherein the video laryngoscopy sleeve is specifically configured to receive a separate video baton.

7. A video laryngoscope comprising:
a handle configured for gripping by an operator;
a blade extending from the handle configured for insertion through the mouth of a patient;
a first channel that extends through the handle and the blade and that terminates in a first distal opening positioned near a distal end of the blade, wherein the first channel is enclosed, wherein the first channel is sized and configured to contain a video device;
an integrated camera positioned within the first channel;
a clear viewing window provided on the blade that enables a patient's airway to be viewed; and
means for clearing material from the viewing window that could obscure the view of the airway, the means for clearing material including a second channel that extends along a side of the first channel and terminates in a second distal opening that is adjacent to the first distal opening, wherein the second channel is configured to deliver fluid to the second distal opening, the means for clearing material further including a fluid nozzle in fluid communication with the second channel that is configured to eject a jet of fluid transversely across an outer surface of the viewing window that overlies the first channel, wherein the fluid nozzle is integrated into the viewing window and wherein the viewing window covers and seals the second distal opening.

8. The video laryngoscope of claim 7, further comprising a third channel that extends along a side the first channel and terminates in a third distal opening that is adjacent to the first distal opening and positioned on the opposite side of the first distal opening than the fluid nozzle.

9. The video laryngoscope of claim 8, wherein the third channel is configured to apply suction that removes the ejected fluid and any material that the ejected fluid clears from the outer surface of the viewing window.

10. The video laryngoscope of claim 8, wherein the third channel is configured to receive a separate device such that the third channel can be used as a working channel.

11. A laryngoscopy apparatus comprising:
a handle configured for gripping by an operator;
a blade extending from the handle configured for insertion through the mouth of a patient;
a first channel that extends through the handle and the blade and that terminates in a first distal opening positioned near a distal end of the blade, wherein the first channel is enclosed, wherein the first channel is sized such that the first channel is configured to contain a video device or an optical waveguide configured to transmit images to a video device;
a clear viewing window provided on the blade at the first distal opening that enable a patient's airway to be viewed, the viewing window having an outer surface that extends from a first lateral side of the viewing window to a second lateral side of the viewing window;
a fluid delivery channel that extends along the blade to the first lateral side of the viewing window; and
a fluid nozzle in fluid communication with the fluid delivery channel, the fluid nozzle being integrated into and unitarily formed with the viewing window at the first lateral side of the viewing window, the fluid nozzle being configured to eject a jet of fluid across the outer surface of the viewing window from the first lateral side of the viewing window toward the second lateral side of the viewing window to clear material from the viewing window that could obscure the view of the airway.

* * * * *